United States Patent Office 2,870,085
Patented Jan. 20, 1959

2,870,085

PROCESS FOR REGENERATING PLATINUM CATALYST IN A REFORMING PROCESS

Robert M. Love, Baytown, Tex., assignor, by mesne assignments, to Esso Research and Engineering Company, Elizabeth, N. J., a corporation of Delaware No Drawing. Application May 12, 1954
Serial No. 429,367

3 Claims. (Cl. 208—140)

This application is directed to the reforming of hydrocarbons in the presence of hydrogen and a bed of platinum catalyst and particularly to the procedure for regenerating the platinum catalyst and returning it to use.

It is known to reform a hydrocarbon feed stock by flowing vaporized feed stock and hydrogen through a reaction zone containing a platinum catalyst. After the platinum catalyst has been in use for some time, carbon and carbonaceous material accumulate thereon so that it loses its activity for converting hydrocarbons. In accordance with the present invention the platinum catalyst is regenerated by performing a series of operations including the steps of displacing feed stock from the catalyst by passing hydrogen rich gas into contact with said catalyst to displace the hydrocarbons of six carbon atoms and heavier therefrom, then purging the reaction zone and platinum catalyst with a purge gas substantially free of carbon oxides, hydrogen and oxygen, subsequently removing the carbon and carbonaceous compounds from the platinum catalyst by controlled combustion at which the temperature of the flame front does not exceed 1100° F., subsequently purging the reaction zone and catalyst bed with purge gas substantially free from hydrogen, carbon oxides and oxygen, activating the catalyst by contacting it with hydrogen rich gas at a temperature above the dew point of the feed stock and no greater than 1000° F. and then returning the catalyst to reaction conditions by passing a mixture of vaporized hydrocarbon feed stock and hydrogen into contact with the catalyst in the reaction zone.

The feature of the present case is preventing the simultaneous presence of carbon dioxide and hydrogen on the catalyst at elevated temperatures. The reason for this is that I have found that the simultaneous presence of hydrogen and carbon dioxide on the catalyst at elevated temperatures is particularly deleterious to catalyst activity. Carbon monoxide may also be harmful. Thus, the gas used in carrying out the purge in the process of the present invention, both before and after the regeneration step, must be substantially free from hydrogen, oxygen and carbon oxides. Specific examples of such a purge gas are steam, nitrogen and helium. Hydrocarbon gases are less satisfactory and are preferably not employed as purge. It is to be noted that a suitable purge gas may be secured by scrubbing ordinary flue gas which contains substantial amounts of carbon dioxide and only little carbon monoxide with a caustic solution which results in a gas consisting almost entirely of nitrogen and free from carbon dioxide. The maximum upper limit of carbon oxides which may be present simultaneously with hydrogen on a platinum catalyst at elevated temperatures without substantially reducing catalyst activity is approximately 2%.

As a modification of the present invention, the platinum catalyst at elevated temperatures may be initially purged with a purge gas substantially free from carbon oxides, hydrogen and oxygen and after this initial purging to remove hydrogen from the catalyst, flue gas may then be passed into contact with the catalyst and thereafter controlled oxidation of the catalyst caused to take place.

The term "flue gas" is here employed in its conventional meaning of a gas resulting from the combustion of fuel. In the present process, flue gas may conveniently be obtained by the deliberate, substantially complete combustion of a fuel such as methane or natural gas in a so-called inert gas generator, or it may be the gas recovered in the regeneration step, resulting from the combustion of carbonaceous matter from the catalyst bed, or it may be an admixture of gas from both sources.

The maximum $CO_2$ content which may be found in flue gas from the complete combustion of natural gas is 12.1%. Other known gaseous fuels may result in $CO_2$ contents from 10.7% to 23.8%.

Typical flue gas analyses from the two sources mentioned above may be as follows:

| | 1<br>Generated From Natural Gas | 2<br>From Regeneration of Catalyst |
|---|---|---|
| $CO_2$ | 10 | 7 |
| $H_2O$ | 15 | 16 |
| $N_2$ | 75 | 77 |
| $CO$ | Trace | Trace |

For convenience, the composition of the various fluid streams in sequence with which the catalyst may be contacted is set out hereafter in Table I in which a single purge gas is used and in Table II in which an initial purge gas free from hydrogen, oxygen and carbon oxides is used followed by flue gas:

Table I (1) Naphtha plus hydrogen
(2) Hydrogen rich gas
(3) Purge gas, substantially free from $H_2$, $O_2$, and carbon oxides
(4) Combustion supporting gas mixture, substantially free from $H_2$ and carbon oxides.
(5) Purge gas, substantially free from $H_2$, $O_2$ and carbon oxides
(6) Hydrogen rich gas Table II (1) Naphtha plus hydrogen
(2) Hydrogen rich gas
(3) Purge gas, substantially free from $H_2$, $O_2$ and carbon oxides
(3a) Flue gas
(4) Flue gas plus $O_2$ or flue gas plus air
(5) Purge gas, substantially free from $H_2$, $O_2$, and carbon oxides
(6) Hydrogen rich gas The catalytic reforming of a hydrocarbon feed stock particularly naphthenic hydrocarbons is known to the art. Such naphthenic hydrocarbons usually boil in range from about 150° to 500° F. and may be obtained from crude petroleums such as the Coastal crude oils, California type crudes and particularly from naphthenic base crude petroleum. Such naphthenic fractions boiling in the range of 150° to 500° F. may also be obtained from catalytic conversion operations such as catalytic operations and may be employed either alone or in admixture with crude oil fractions as the feed stock for a reforming operation.

In the reforming of hydrocarbon feed stocks it is preferred to pass vaporized feed stock through the reaction zone at a liquid space velocity in the range from about 1 to about 4 liquid volumes of feed per volume of catalyst per hour. A space velocity of 2 v./v./hr. gives very desirable results when charging a Coastal crude fraction.

The reactor inlet temperature may be within the range of 850° to 1000° F. with a preferred temperature of about 925° F. The reforming reaction being endothermic, and commercial reactors ordinarily operating adiabatically, the reactor outlet temperature will ordinarily be between 700° and 950° F.

The pressure employed in the reaction zone may be within the range of 50 to 700 pounds per square inch with a preferred range of about 200 to about 400 pounds per square inch.

The amount of hydrogen employed for the reaction may range from about 1000 cubic feet to about 10,000 cubic feet per barrel of feed. Preferably about 5000 cubic feet of hydrogen per barrel of feed may be used.

The catalyst employed in the practice of the present invention preferably will be a platinum on alumina catalyst containing from about 0.1% to 3.0% by weight of platinum, preferably 0.2% to 1.0% by weight. It is desirable that the alumina on which the platinum is deposited be a purified alumina, such as a gamma alumina derived from boehmite. Although gamma alumina or purified alumina is preferred, I may use a platinum on alumina derived from other sources. There are numerous aluminas on the market which are available as supports for catalysts and I intend that I may use a platinum on alumina catalyst of the type available. I also intend that other supported platinum catalysts may be used such as platinum on zirconia, magnesia, and magnesia-alumina mixtures, and the like.

When starting up, the reaction zone containing the platinum catalyst activated ready for use is usually brought onstream by passing a gas substantially free from carbon oxides and from hydrocarbons of more than 5 carbon atoms and containing at least 50% hydrogen through the reaction zone to heat it to a temperature greater than the dew point of the feed stock and no greater than 1000° F. Usually the temperature of the bed is increased gradually by the introduction of gas first at 800° F. and gradually increasing the temperature to the selected reactor inlet temperature, say 950°, whereupon vaporized feed stock is introduced into the reaction zone in admixture with hydrogen and the reforming operation commenced. The flow of feed stock and hydrocarbon is continued so as to form desired product until the catalyst has become fouled with carbonaceous material and carbon to such an extent as to lose a substantial amount of its activity.

In accordance with the present invention the procedure for regenerating the platinum catalyst which has become fouled with carbon and carbonaceous material involves the carrying out of the following steps in sequence. The platinum catalyst is taken out of service by cutting out the vapors of feed stock while continuing the flow of the hydrogen containing gas until the hydrocarbons having 6 or more carbon atoms in the molecule, are displaced from the reaction zone by the stream of gas. Thereafter the reaction chamber containing the bed of platinum catalyst is purged by the use of a purge gas which is inert to the platinum catalyst and in particular must be substantially free from carbon oxides, hydrogen and oxygen. As specific examples of gases suitable for use as the purge gas may be mentioned nitrogen, steam, and helium and the like. Thereafter the carbon and carbonaceous deposits are removed from the catalyst by controlled combustion by flowing into the reaction zone regenerating gas consisting of a non-combustible, non-combustion supporting component and controlled amounts of oxygen so that the flame front of the flame advancing through the catalyst bed never exceeds 1000° F. A more complete description of such a combustion step is found in my co-pending application Serial No. 343,198, filed March 18, 1953, entitled "Treatment of Platinum Catalyst." After the controlled combustion has removed the deposits of carbon and carbonaceous material from the bed, the entire reaction zone containing the platinum catalyst is then purged by passing into said reaction zone a purging gas which must be substantially free of carbon oxides, hydrogen and oxygen. After said purging step, the platinum catalyst may then be activiated by first passing hydrogen containing gas into said reaction zone at a temperature to bring the temperature of the catalyst gradually to a temperature approaching the desired reactor inlet temperature, within the range of 850° to 1000° F., and the reaction chamber is then placed onstream by introducing a mixture of vaporized feed stock and hydrogen into said reaction chamber to cause reforming of said feed stock. In this fashion the cycle may be continually repeated.

It is to be emphasized in the procedure of the present case that the purge gas must be substantially free from carbon oxides, hydrogen and oxygen, because the simultaneous presence of carbon dioxide and hydrogen on the platinum catalyst at elevated temperatures both before and after the controlled combustion of carbon and carbonaceous deposits from the used catalyst is particularly deleterious to the catalyst activity. Thus, while the flue gas containing substantial amounts of carbon dioxide has heretofore been used in the regeneration of catalyst, I found that flue gas, which contains carbon oxides substantially in excess of 2%, must not be brought into contact with the platinum catalyst in the presence of hydrogen.

It should be understood that the present invention is equally applicable in the situation where platinum catalyst is subjected to a reactivation step after it has lost part of its activity in such manner that conventional regeneration will not restore it to the desired activity. In such an operation, the controlled combustion step as described herein may be followed by a period during which the catalyst is contacted at an elevated temperature with oxygen containing gas having a partial pressure of at least one atmosphere of oxygen. According to the present invention, the oxygen containing gas will be displaced from the catalyst at the completion of the reactivation step by a gas substantially free from $H_2$, $O_2$, and carbon oxides and the catalyst may then be contacted with hydrogen rich gas, followed by contact with hydrocarbon feed and hydrogen under reaction conditions.

What is claimed as the present invention is:

1. A regenerative reforming process consisting of the steps of passing a charge mixture consisting of vaporized naphthenic hydrocarbon boiling within the range between 150 and 500° F. and hydrogen at an inlet temperature in the range of 850 to 1000° F. into contact with a fixed bed of platinum catalyst in a reaction zone to reform at least a portion of the hydrocarbon in the charge mixture, continuing the flow of the charge mixture over the platinum catalyst until said catalyst has been at least partially deactivated by the deposit of carbonaceous material thereon, discontinuing the flow of the charge mixture into the reaction zone and continuing to flow hydrogen containing gases into the reaction zone to displace the feed hydrocarbon from the reaction zone and immediately thereafter passing flue gas previously scrubbed with caustic and containing no more than 2% carbon oxides over said catalyst to displace the components of the charge mixture therefrom, thereafter introducing flue gas which has not been scrubbed with caustic into said reaction zone and admixing controlled amounts of air with said flue gas to cause combustion in the catalyst bed with a combustion flame front in the bed not over 1100° F. until the carbonaceous material has been burned from said bed, thereafter passing flue gas previously scrubbed with caustic into said reaction zone to displace the components of the combustion supporting mixture of flue gas and oxygen from said zone, thereafter contacting the bed with gas containing free hydrogen at an elevated temperature sufficient to cool said catalyst to said inlet temperature of about 850° to about 1000° F.

and thereafter introducing a charge mixture consisting of vaporized naphthenic hydrocarbon and hydrogen at a temperature within the range of 850 to 1000° F. into the reaction zone into contact with said activated catalyst to reform at least a portion of said hydrocarbon.

2. A regenerative reforming process consisting of the steps of passing a charge mixture consisting of vaporized naphthenic hydrocarbon boiling within the range between 150 and 500° F. and hydrogen at an inlet temperature in the range of 850 to 1000° F. into contact with a fixed bed of platinum catalyst in a reaction zone to reform at least a portion of the hydrocarbon of the charge mixture, continuing the flow of the charge mixture over the platinum catalyst until said catalyst has been at least partially deactivated by the deposit of carbonaceous material thereon, discontinuing the flow of charge mixture into the reaction zone and continuing to flow hydrogen containing gases into the reaction zone to displace feed hydrocarbon from the reaction zone and immediately thereafter flowing flue gas previously scrubbed with caustic and containing no more than 2 percent carbon oxides as a purge gas over said catalyst to displace the components of the charge mixture therefrom, continuing to flow the scrubbed flue gas over the catalyst and admixing controlled amounts of air with said scrubbed flue gas to cause controlled combustion in the catalyst bed with a combustion flame front in the bed not over 1100° F. until the carbonaceous material has been burned from said bed, terminating the mixture of air with the scrubbed flue gas and continuing to pass the scrubbed flue gas into the reaction zone to displace the combustion supporting mixture of scrubbed flue gas and air from said zone, thereafter activating the bed by contacting it with gas containing free hydrogen at an elevated temperature sufficient to cool said catalyst to said inlet temperature of about 850° to about 1000° F. and thereafter admixing a charge mixture consisting of vaporized naphthenic hydrocarbon and hydrogen at a temperature within the range of 850 and 1000° F. into the reaction zone into contact with said activated catalyst to reform at least a portion of said hydrocarbon.

3. A regenerative reforming process comprising the steps of passing a charge mixture consisting of vaporized hydrocarbon and hydrogen into a reaction zone containing a fixed bed of platinum catalyst to reform at least a portion of the hydrocarbon in said charge mixture under conversion conditions including an inlet temperature within the range of about 850° to about 1000° F. and continuing the flow of said charge mixture into said reaction zone until the catalyst has been at least partially deactivated by the deposit of carbonaceous material thereon, discontinuing the flow of vaporized hydrocarbon and continuing the flow of hydrogen-containing gases into the reaction zone to displace the hydrocarbon feed from the reaction zone, immediately thereafter passing flue gas previously scrubbed with caustic and containing no more than 2 percent carbon oxides as a purge gas into the reaction zone to displace hydrogen, flowing a flue gas and admixed controlled amounts of air through said reaction zone to cause controlled combustion of the deposits of carbonaceous material at a combustion temperature no greater than 1100° F., discontinuing the addition of air, immediately thereafter passing flue gas previously scrubbed with caustic and containing no more than 2 percent carbon oxides through said reaction zone to displace the oxygen, thereafter contacting the platinum catalyst with a hydrogen-containing gas at an elevated temperature sufficient to adjust the temperature in said conversion zone to an inlet temperature of about 850° to about 1000° F., and introducing a charge mixture consisting of vaporized hydrocarbon and hydrogen into the reaction zone into contact with the platinum catalyst to reform at least a portion of said hydrocarbon.

References Cited in the file of this patent

UNITED STATES PATENTS

| | | |
|---|---|---|
| 2,155,853 | Anthony | Apr. 25, 1939 |
| 2,273,864 | Houdry | Feb. 24, 1942 |
| 2,357,365 | Van Horn et al. | Sept. 5, 1944 |
| 2,372,018 | Ruthruff | Mar. 20, 1945 |
| 2,403,319 | Williams | July 2, 1946 |
| 2,479,110 | Haensel | Aug. 16, 1949 |
| 2,662,861 | Riblett et al. | Dec. 15, 1953 |
| 2,692,847 | Rex | Oct. 26, 1954 |
| 2,773,014 | Snuggs et al. | Dec. 4, 1956 |
| 2,792,337 | Engel | May 14, 1957 |